(12) United States Patent
Simelius

(10) Patent No.: US 7,493,291 B2
(45) Date of Patent: Feb. 17, 2009

(54) SYSTEM AND METHOD FOR LOCALLY SHARING SUBSCRIPTION OF MULTIMEDIA CONTENT

(75) Inventor: Kim Simelius, Tampere (FI)

(73) Assignee: Nokia Corporation, Espoo (FI)

( * ) Notice: Subject to any disclaimer, the term of this patent is extended or adjusted under 35 U.S.C. 154(b) by 1001 days.

(21) Appl. No.: 10/484,586

(22) PCT Filed: Feb. 6, 2003

(86) PCT No.: PCT/IB03/00394

§ 371 (c)(1),
(2), (4) Date: Jan. 23, 2004

(87) PCT Pub. No.: WO2004/070588

PCT Pub. Date: Aug. 19, 2004

(65) Prior Publication Data

US 2005/0071278 A1    Mar. 31, 2005

(51) Int. Cl.
*H04K 1/00* (2006.01)
*H04L 9/00* (2006.01)

(52) U.S. Cl. .............................. 705/59; 705/1; 705/51; 713/173; 713/200

(58) Field of Classification Search .................... 705/1, 705/51, 57, 59; 713/173, 200
See application file for complete search history.

(56) References Cited

U.S. PATENT DOCUMENTS

| 6,810,389 | B1 * | 10/2004 | Meyer | 705/59 |
| 7,073,063 | B2 * | 7/2006 | Peinado | 713/171 |
| 2003/0069827 | A1 * | 4/2003 | Gathman et al. | 705/37 |
| 2004/0031058 | A1 * | 2/2004 | Reisman | 725/112 |

* cited by examiner

*Primary Examiner*—Andrew J. Fischer
*Assistant Examiner*—Mamon Obeid
(74) *Attorney, Agent, or Firm*—Perman & Green, LLP

(57) ABSTRACT

This invention relates to a method, devices and system for distributing rights to a digital content and for accessing said digital content. Further, the invention relates to a voucher structure defining rights to said digital content. Still further, the invention relates to a digital content structure adapted for arranging the distribution of rights to the digital content.

29 Claims, 5 Drawing Sheets

SYSTEM AND METHOD FOR LOCALLY SHARING SUBSCRIPTION OF MULTIMEDIA CONTENT

This application claims priority to International Application No. PCT/IB2003/000394 filed on Feb. 6, 2003 published on Aug. 19, 2004 as WO 2004/070588.

FIELD OF INVENTION

This invention relates to a method, devices and system for distributing rights to a digital content and for accessing said digital content. Further, the invention relates to a voucher structure defining rights to said digital content. Still further, the invention relates to a digital content structure adapted for arranging the distribution of rights to the digital content.

BACKGROUND OF INVENTION

U.S. patent application Ser. No. US 2002/0013772 and International patent applications no. WO00/58811 and no. WO00/59150 (all emanating from U.S. provisional application 60/126,614) disclose ways of distributing and binding a digital licence to a user device using Digital Rights Management (DRM). A DRM system operates on a computing device when a user requests a digital piece of content to be rendered by the computing device. The system has a license store, a licence evaluator, and a state store, and keeps track of possible content rendering. The digital content is encrypted according to a content key (KD) on a user device having a public key (PU) and a corresponding private key (PR). To render digital content a digital licence corresponding to the content is obtained, where the digital licence includes the content key (KD) therein in an encrypted form. The encrypted content key (KD) from the digital license is decrypted to produce the content key (KD), and the public key (PU) of the user device is obtained there from. The content key (KD) is then encrypted according to the public key (PU) of the user device (PU(KD)), and a sub-license is composed corresponding to and based on the obtained license, where the sub-license includes (PU(KD)). The composed sub-license is then transferred to the user device, wherein the user device can decrypt (PU(KD)) with the private key thereof (PR) to produce the content key (KD), and can render the encrypted content on the user device with the produced content key (KD).

The disclosed system requires a separate license for each computing device ordering a particular digital content, thus effectively limiting the fast distribution of content throughout a plurality of computing devices. Hence when a plurality of users request an identical content every user must have a separate licence.

International patent application no. WO01/98903 discloses methods and systems for distributing content via a network using distributed conditional access agents to perform DRM. These include a watermarking operation to watermark content distributed to a content consumer. Further, an encryption operation encrypts content using a key associated with the content consumer. The content provider generates a set of session keys, encrypts the content using the set of session keys, and communicates the session keys to a content distributor. The content distributor encrypts the set of session keys using a user key so as to generate a set of encrypted keys, which are subsequently communicated to the content consumer. The content distributor further communicates the user key to the content consumer, which upon receipt decrypts and extracts the set of session keys and uses the set of session keys to decrypt the encrypted content. The set of session keys can be a time-varying sequence of session keys. The process can include authentication and verification of the user credentials against content access criteria. As described above with reference to US 2002/0013772, WO00/58811 and WO00/59150 these systems and methods are directed to one user/one device concept.

The patent applications US 2002/0013772, WO00/58811, WO00/59150, and WO01/98903, which patent applications are incorporated by reference in present specification, introduce problems since users want to experience the same right with digital media as with conventional media.

SUMMARY OF THE INVENTION

An object of the present invention is to provide a flexible distribution of digital content to content users, still protecting the content from unauthorised use or copying.

A particular advantage of the present invention is provision of freedom for the content user to use the content in different devices apart from the downloading device. It is further an advantage that a group of users, e.g. a family, can use the content as would be the case with conventional media. Further an advantage is that the content provider can deliver digital content in an attractive and useful way without risking unauthorised use or copying.

A particular feature of the present invention relates to the provision of main vouchers defining the content user's rights to the digital content, wherein the main voucher further comprise child vouchers defining use in other devices than the downloading device, or by other users in the proximity of the user having the main voucher.

The above object, advantage and feature together with numerous other objects, advantages and features, which will become evident from below detailed description, is obtained according to a first aspect of the present invention by a system for providing a first client family comprising a first parent client and one or more first child clients connected in a second communication network access to a first digital content and comprising:

(a) a right of use voucher associated with said first digital content and comprising a first content key and one or more first child vouchers; and
(b) a content provider adapted to connect to said first parent client through a first communication network and adapted to communicate said right of use voucher to said first parent client; and wherein said right of use voucher enables said first parent client to communicate said one or more first child vouchers to said one or more first child clients through said second communication network, which one or more first child vouchers enable said one or more first child clients to access said first digital content associated with said right of use voucher.

The term "first" and "second" should in this context entirely be construed as term for differentiating between two elements and not be construed as a timing consideration.

The right of use voucher according to the first aspect of the present invention may be adapted to enable the first parent client to access the first digital content from the content provider through the first communication network by applying the first content key. Further first parent client may comprise an encryption key adapted to encrypt the first digital content for the one or more first child clients comprising a decryption key associated with the encryption key.

The first client family according to the first aspect of the present invention may comprise a laptop or desktop computer, a personal digital assistant, a mobile or cellular phone, a set-top box, television set, a videophone, an accessory thereof, or any combination thereof. That is, a wide variety of electrical gadgets may in fact be connected to the content server. In fact, an oven, fridge or washing machine may connect to the content server and receive particular data from the content provider, for example, enabling the electrical gadget to perform in a different or better way. Alternatively, the device connecting to the content server may be an electronic device dedicated for the purpose of sharing digital content around itself, e.g., a digital subscription module fitted in a private home, an office or a public site. Yet alternatively, the device connecting to the content server may be a virtual arrangement, whereby the device is an non-physical realization in the virtual reality world, and stores links to the content and the vouchers instead of storing them physically. The accessory may comprise MP3 players, smart headphones, video goggles, newspaper or book reading equipment.

The first communication network according to the first aspect of the present invention may comprise a wired or wireless telecommunication network, a terrestrial, satellite, or cable television network, a power-line network, a computer network, or any combination thereof. Alternatively, the first communication network may partly or wholly be realized by using physical, tangible carriers like floppy disks, CDs, DVDs, memory cards and sticks or any other transportable media. Yet alternatively, the first network may be realized by a download of content and right of use vouchers over a local connection such as short-range radio or infrared connection. Further, the second communication network may comprise a computer network, a wired or wireless telecommunication network, a power-line network, a television network, a proximity terrestrial network such as short range radio or Bluetooth, or any combination thereof. The second communication network is particularly advantageous when implemented as a short range radio or Bluetooth solution since the parent client in this way may act as a micro transmitter of digital content for child clients in the vicinity.

The computer network according to the first aspect of the present invention may comprise a wired or wireless local area network, metropolitan area network, wide area network, inter-network, or any combination thereof. The inter-network such as the Internet provides an ideal solution for the first communication network since digital content may be accessed from any geographical area. Also existing distribution networks for renting or selling digital media such as music CDs and video DVDS may be used for this purpose The one or more first child clients according to the first aspect of the present invention may comprise a connection to the first communication network and the content provider may enable the one or more first child clients having a child voucher to access the first digital content from the content provider through the first communication network. The system thus provides a plurality of access points to the content provider so that the digital content may be easily accessed from a plurality of clients simultaneously during for example a streaming of the digital content.

Further, the one or more first child vouchers may enable the one or more first child clients to access digital content from the first parent client through the second communication network. This is particularly beneficiary in situations where the child clients connection to the first communication network is disconnected then the parent client without burden to the first communication network provides a stream of the digital content to the child clients.

The first digital content according to the first aspect of the present invention may comprise graphics, series of graphics, text, series of texts, picture, series of pictures, video, sequences of videos, audio track or series of audio tracks or any combination thereof. In fact, the digital content may be control data for electrical gadgets, or music, film, or literary compositions.

The right of use voucher according to the first aspect of the present invention may further comprise:
(a) a first identification tag for identifying a specific first parent client of said first client family owning said right of use voucher;
(b) a second identification tag for identifying content provider enabling access for said specific first parent client and one or more first child clients to said first digital content;
(c) an authentication key pair operable for authenticating said one or more child vouchers and comprising a public authentication key and a private authentication key.

The first identification tag may be utilised during the periodical authentication of the parent client before the content provider. The parent client may authenticate before the content provider by signing the first and/or second identification tag using the parent client's private key.

The content provider according to the first aspect of the present invention may enable the first parent client to authenticate the one or more first child clients having the one or more first client vouchers by communicating a signed child voucher refresher comprising a validity period of associated first child voucher and an identification tag of the associated first child voucher. The authentication key pair may advantageously be utilised by the parent client for authenticating the child clients. The parent client may encrypt and sign the child voucher refresher applying the public authentication key and require the child client to run in a secure mode before the content key may be used for accessing the first digital content.

It needs to be noted that the parent client needs not necessarily obtain direct access to the digital content, but may instead act as a holder of the parent voucher as well as a child client using one of the child vouchers contained in the parent voucher. In this way, all devices using the digital content may be treated equally with respect to the access to the digital content.

Each of the one or more first child vouchers according to the first aspect of the present invention may comprise a copy of the first content key operable to enable each of the one or more first child clients access to the first digital content. By distributing the delegation of content keys the content provider is freed from recordation of a plurality of clients and instead the content provider only needs to record and authenticate the client families since the parent may authenticate the child clients.

The content provider according to the first aspect of the present invention may be adapted to encrypt the right of use voucher by applying a public encryption key of the first parent client. By encrypting the right of use voucher the voucher may be communicated safely across the first communication network.

Further, the content provider may be adapted to enable the first parent client to download the first digital content to a local memory, to view the first digital content at the content provider, to receive a stream of the first digital content from the content provider, or any combination thereof. The term "download" should in this context be construed as a transfer of the entire digital content from the content provider to the client, also by using physical memory media, the term "view" should in this context be construed as the content provider executing digital content, i.e. utilising editorial platform, and providing a terminal view of the digital content for the clients from the editorial platform, and finally the term "stream"

should in this context be construed as the content provider providing a continuous stream of data from the digital content.

The content provider according to the first aspect may further be adapted to enable the one or more first child clients to view the first digital content at the content provider or the first parent client, to receive a stream of the first digital content from the content provider or the first parent client, or any combination thereof. The digital content may thus be provided by the content provider or alternatively or additionally by the parent client. The latter becomes significant whenever the access points to the first communication network are limited, for example, due to costs.

The content provider according to the first aspect of the present invention may further be adapted to connect to a second client family comprising a second parent client and one or more second child clients connected through a third communication network and wherein the content provider is adapted to enable the one or more second child clients access to a second digital content on the basis of one or more second child vouchers associated with the second digital content and with each of the one or more second child clients. Obviously, the content provider may connect to a plurality of client families and provide a plurality of digital contents to any of the client families connected to the first communication network.

The second parent client, the one or more second child clients and the one or more second child vouchers may incorporate any features of the first parent client, the one or more first child clients and the one or more first child vouchers, respectively. Further, the third communication network may incorporate any features of the second communication network.

The content provider according to the first aspect may be adapted to enable a first child client of the first client family and a second child client of the second client family to exchange a first child voucher associated with the first digital content and with the first child client and a second child voucher associated with the second digital content and with the second child client. The enabling of switching child vouchers between two child clients from different client families is particularly flexible compared to prior art since while the digital content cannot be copied the digital content. may flow between a plurality of authenticated and validated clients.

The exchange of the one or more first and second child vouchers between the one or more first and second child clients may be accomplished by the content provider enabling the first and second parent or one or more child clients to verify the compatibility between the one or more first and second child vouchers; the first and second parent to deactivate exchanged child vouchers by setting stale flags in associated right of use vouchers; a first child client of the one or more first child clients having a second child voucher of the one or more second child vouchers access to the second digital content by means of the second child voucher provided that the first parent client and the second parent client are able to authenticate the validity of the second child voucher; and enabling a second child client of the one or more second child clients having a first child voucher of the one or more first child vouchers access to the first digital content by means of the first child voucher provided that the first parent client and the second parent client are able to authenticate the validity of the first child voucher.

The above objects, advantages and features together with numerous other objects, advantages and features, which will become evident from below detailed description, are obtained according to a second aspect of the present invention by a right of use voucher for enabling a client family access to digital content associated with said right of use voucher and comprising:
 (a) a first identification tag for identifying a parent client of said client family owning said right of use voucher;
 (b) a second identification tag for identifying content provider enabling access for said parent client and one or more child clients of said client family to said digital content;
 (c) one or more child vouchers comprising a content key operable to enable said one or more child clients access to said digital content; and
 (d) an authentication key pair operable for authenticating said one or more child vouchers and comprising a public authentication key and a private authentication key.

The right of use voucher according to the second aspect of the present invention may incorporate any features of the system according to the first aspect of the present invention.

The above objects, advantages and features together with numerous other objects, advantages and features, which will become evident from below detailed description, are obtained according to a third aspect of the present invention by a method for providing access to digital content comprising:
 (a) connecting to a first parent client by means of a content provider utilising a communication network;
 (b) communicating a first right of use voucher comprising one or more first child vouchers by means of said content provider to said first parent client;
 (c) enabling said first parent client to forward said one or more first child vouchers to one or more first child clients through a second communication network; and
 (d) enabling said one or more first child clients to access said first digital content by means of said one or more first child vouchers provided that the validity of said one or more first child vouchers is authenticated.

The validity of the one or more first child vouchers according to the third aspect of the present invention may be authenticated by the first parent client.

The method according to the third aspect of the present invention may further comprise (e) enabling the first parent client to access a first digital content provided by the content provider by means of the first right of use voucher. Further, the method may further comprise (f) encrypting the first digital content in accordance with an encryption key by means of the first parent client for the one or more first child clients comprising a decryption key associated with the encryption key.

The one or more first child clients according to the third aspect of the present invention may be enabled to access the first digital content at the content provider. Alternatively, the one or more first child clients may be enabled to access the first digital content at the first parent client. By this approach a highly increased flexibility is given, although unauthorised copying and use of the digital content is prevented.

Enabling the one or more first child clients to access the first digital content according to the third aspect of the present invention may comprise downloading the first digital content, viewing the first digital content, streaming the first digital content, or any combination thereof. The preferred access method depends highly on the type of digital content, and on the kind of client apparatus. Thus the present invention provides a beneficiary possibility to enhance the known technology within the state of the art.

The method according to the third aspect of the present invention may further comprise (g) receiving by means of the content provider a report from the first parent client, which report comprises information on number child vouchers generated by means of a child voucher generating means associated with the right of use voucher. This makes it possible for the content provider to track redistribution of the digital content, and the received information may be used for a multitude of things, such as statistics, marketing, pricing or for other service development purposes.

The method according to the third aspect of the present invention may further comprise:

(h) enabling the first parent clients to encrypt the one or more first child vouchers with a public encryption key associated with the one or more first child clients before communicating the one or more first child vouchers to the one or more first child clients;

(i) enabling the one or more first child clients to decrypt the one or more first child vouchers with a private encryption key associated with the one or more first child clients to reveal a content key to enable access to the first digital content.

In the method according to the third aspect of the present invention (h) and (i) may be performed in a secure mode.

The use of encryption and decryption in a secure mode to distribute a digital content encryption key for enabling access to the digital content, effectively prevents unauthorised use of the digital content. On the other hand, the method according to the third aspect of the present invention may enable authorised use in a user-friendly manner.

The method according to the third aspect of the present invention may further comprise enabling the first parent client to authenticate the one or more first child clients by communicating a signed child voucher refresher including a new validity period for the one or more first child vouchers and an identification tag of the one or more first child vouchers. The authentication will thus provided a feasible solution for the child client to achieve a right to access limited in time, and to get an update on said right to access. On the other hand, the parent client and the content provider may control the child clients' right to access in a functional manner.

The method according to the third aspect of the present invention may further comprise:

(j) connecting to a second parent client by means of the content provider utilising the communication network;

(k) communicating a second right of use voucher including one or more second child vouchers by means of the content provider to the second parent client;

(l) enabling the second parent client to access a second digital content provided by the content provider by means of the second right of use voucher;

(m) enabling the second parent client to forward the one or more second child vouchers to one or more second child clients through a third communication network; and (n) enabling the one or more second child clients to access the second digital content by means of the one or more second child vouchers provided that the validity of the one or more second child vouchers is authenticated by the second parent client; and (o) enabling the one or more first child clients and the one or more second child clients to exchange the one or more first child vouchers and the one or more second child vouchers.

This provides a solution for more flexible use of digital content across a plurality of devices, while the use cannot be freely copied. The exchange of rights to access digital content between devices will facilitate a user-friendly environment in any situation for consuming the digital content.

Enabling exchange of the one or more first and second child vouchers between the one or more first and second child clients according to the third aspect of the present invention may further comprise:

(i) verifying compatibility between one or more first and second child vouchers;

(ii) deactivating to-be-exchanged child vouchers by setting stale flags in associated right of use vouchers in the first and second parent client;

(iii) enabling a first child client of the one or more first child clients having a second child voucher of the one or more second child vouchers access to the second digital content by means of the second child voucher provided that the first parent client and the second parent client are able to authenticate the validity of the second child voucher; and (iv) enabling a second child client of the one or more second child clients having a first child voucher of the one or more first child vouchers access to the first digital content by means of the first child voucher provided that the first parent client and the second parent client are able to authenticate the validity of the first child voucher.

The use of a protocol to exchange child vouchers may enable devices of different types to safely exchange and ease handling of vouchers.

The method according to the third aspect of the present invention may further comprise:

(p) enabling access by a basic voucher to a low-resolution stream comprising one or more basic data sets;

(q) enabling access by a first enhanced voucher to a first enhancement stream comprising one or more first data sets, which first data sets are based on the basic data sets.

The method according to the third aspect of the present invention may further comprise (r) enabling access by a second enhanced voucher to a second enhancement stream comprising one or more second data sets, which second data sets are based on the first data sets.

Providing digital content in this multi-resolution manner further improves the feasibility to provide pre-views, low-resolution content adapted to certain types of clients, extracts from the digital contents or the like by a first voucher, and to provide higher resolution content to other vouchers.

The method according to the third aspect of the present invention may incorporate any features of the right of use voucher according to the second aspect of the present invention and the system according to the first aspect of the present invention.

The above objects, advantages and features together with numerous other objects, advantages and features, which will become evident from below detailed description, are obtained according to a fourth aspect of the present invention by a content provider server for providing a right of use voucher enabling a client family access to digital content associated with said right of use voucher comprising:

(a) means for generating a first identification tag for identifying a parent client of said client family owning said right of use voucher;

(b) means for generating a second identification tag for identifying content provider enabling access for said parent client and one more child clients of said client family to said digital content;

(c) means for generating one or more child vouchers comprising a content key operable to enable said one or more child clients access to said digital content; and (d) means for generating an authentication key pair operable for authenticating said one or more child vouchers and comprising a public authentication key and a private authentication key.

The content provider server according to the fourth aspect of the present invention may incorporate any features of the right of use voucher according to the second aspect of the present invention, the system according to the first aspect of the present invention, and the method according to the third aspect of the present invention.

The above objects, advantages and features together with numerous other objects, advantages and features, which will become evident from below detailed description, are obtained according to a fifth aspect of the present invention by a communication terminal for receiving a right of use voucher enabling access for said communication terminal and one or more designated child terminals to a digital content associated with said right of use voucher according to claim 20, and comprising:

(a) means for identifying said first and second identification tag of said right of use voucher;
(b) means for distributing one or more child vouchers comprising a content key operable to enable said one or more designated child terminals access to said digital content; and
(c) means for processing an authentication key pair operable for authenticating said one or more child vouchers and comprising a public authentication key and a private authentication key.

The above objects, advantages and features together with numerous other objects, advantages and features, which will become evident from below detailed description, are obtained according to a sixth aspect of the present invention by a communication terminal for receiving a child voucher enabling access a digital content associated with a right of use voucher according to claim 20, and comprising:

(a) means for revealing a content key from said child voucher operable to enable said client access to a digital content;
(b) means for accessing said digital content through a communication network.

A communication terminal according to the fifth and sixth aspect of the present invention should in this context be construed as a mobile or cellular phone, a wired phone, a laptop or desktop computer, a personal digital assistant, a set-top box, television set, a videophone, or any combination thereof.

The communication terminal according to sixth aspect of the present invention may be adapted to access said digital content from a content provider, from said parent client, or any combination thereof.

A communication terminal according to the fifth and sixth aspect of the present invention may incorporate any features from one another and/or from the right of use voucher according to the second aspect of the present invention, the system according to the first aspect of the present invention, the method according to the third aspect of the present invention, and the content provider server according to the fourth aspect of the present invention.

The above objects, advantages and features together with numerous other objects, advantages and features, which will become evident from below detailed description, are obtained according to a seventh aspect of the present invention by a computer program comprising code adapted to perform the following steps when said program is run on a processor:

(a) connecting to a first parent client by means of a content provider utilising a communication network;
(b) communicating a first right of use voucher comprising one or more first child vouchers by means of said content provider to said first parent client;
(c) enabling said first parent client to forward said one or more first child vouchers to one or more first child clients through a second communication network; and
(d) enabling said one or more first child clients to access said first digital content by means of said one or more first child vouchers provided that the validity of said one or more first child vouchers is authenticated.

The processor according to the seventh aspect of the present invention may comprise a content provider, a parent client, a child client, or any combination thereof.

A computer program according to the seventh aspect of the present invention may incorporate any features of the right of use voucher according to the second aspect of the present invention, the system according to the first aspect of the present invention, the method according to the third aspect of the present invention, the content provider server according to the fourth aspect of the present invention, and the communication terminal according to the fifth and sixth aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
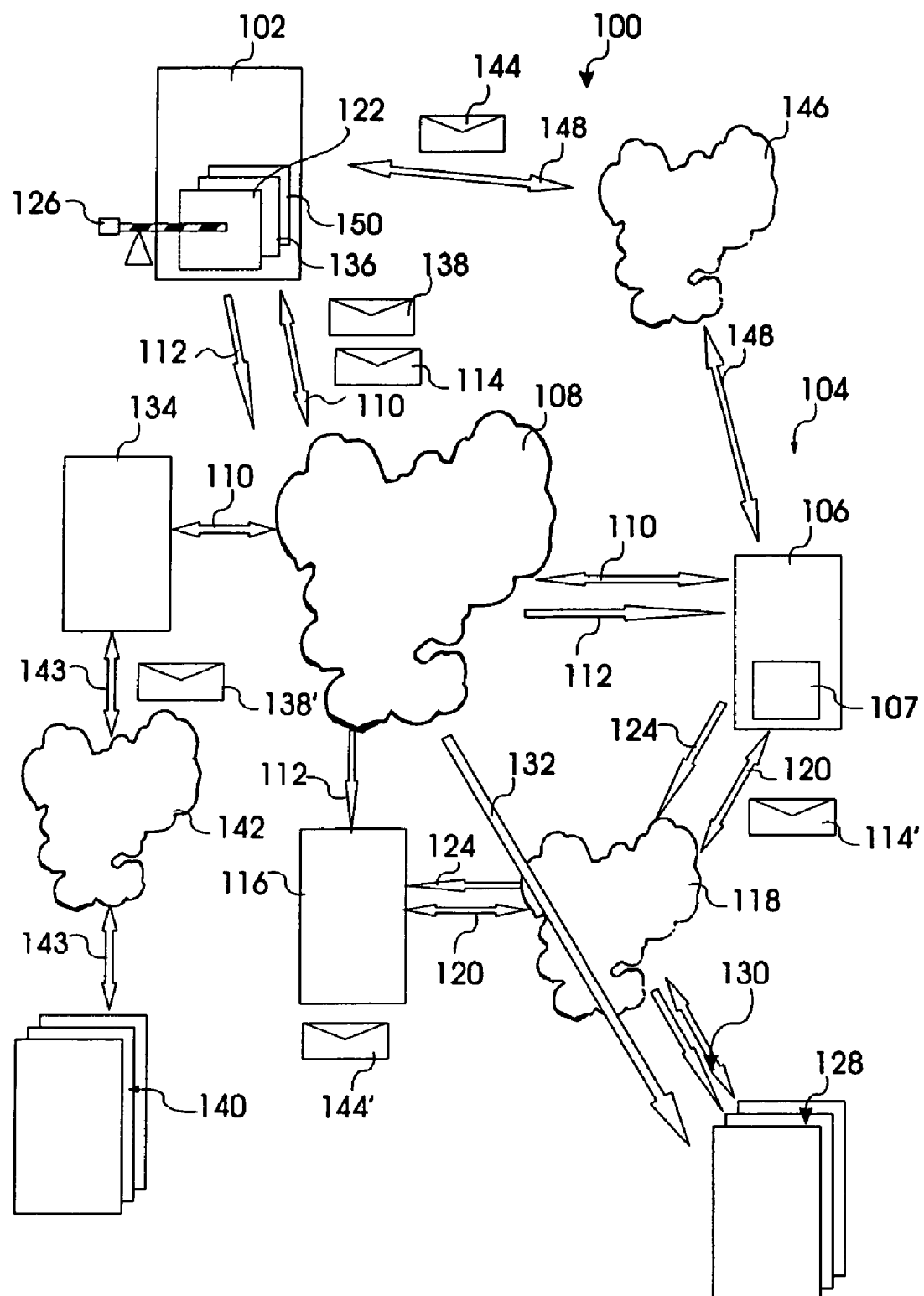
FIG. 1, shows an overall view of a system according to a first embodiment of the present invention.

FIG. 1 shows a system for providing access to digital content and according to a first embodiment of the present invention, which system is designated in its entirety by reference numeral 100. The system 100 comprises a content provider 102, such as an Internet server or a proxy server, providing digital content to a plurality of clients designated in entirety by reference numeral 104. The plurality of clients 104 may comprise a mobile terminal, such as a mobile or cellular telephone and accessories thereto; a personal digital assistant; a laptop or desktop computer and accessories thereto e.g. computer or telecommunication network access points; or any combination thereof. Further, the plurality of clients 104 may comprise low end mobile terminals; accessories of low end mobile terminals; multimedia extensions to computers such as MP3 players, smart headphones or video goggles; newspaper or book reading devices, or any combination thereof.

Digital content is in this context to be construed as digitised files containing newspapers, magazines, books, music, and films, broadcast programs i.e. vocal, video or both, or parts thereof.

The content provider 102 is connected to a first parent client 106 of the plurality of clients 104 through a first communications network 108 such as a computer network, a wired or wireless telecommunication network, a power network, a television network, or any combination thereof. Also physical carriers like CDs, DVDs, or any other memory means may be used. The content provider 102 utilises the communication network 108 to communicate control signals to the parent client 106, which control signals are shown as arrows 110 in FIG. 1. Further, the content provider 102 utilises the communication network 108 to communicate digital content signals to the plurality of clients 104, which digital content signals are shown as arrows 112 in FIG. 1.

The control signals 110 comprise a first right of use voucher 114 for digital content administrated by the content provider 102. The right of use voucher will be further described with reference to FIG. 2.

The first right of use voucher 114 comprises one or more first child vouchers 114', of which one is forwarded by the parent client 106 to a child client 116. The parent client 106 connects to the child client 116 through a second communication network 118 and forwards the first child voucher 114' as control signals, shown in FIG. 1 as arrows 120.

The first right of use voucher 114 enables the parent client 106 to access associated digital content, such as a first digital content 122, provided by the content provider 102. Access should in this context be construed as enabling reading capabilities to the plurality of clients 104. Accessing of the first digital content 122 may entail transferring or downloading of the first digital content 122 to the parent client 106, viewing the first digital content 122 at the content provider 102, streaming the first digital content 122 from the content provider 102 to the parent client 106, or any combination thereof.

The first child voucher 114' enables the first child client 116 to access the first digital content 122 provided that the first parent client 106 is able to authenticate the validity of the first child voucher 114' during its use. The first child client 116 may access the first digital content 122 directly at the content provider 102 through the first communication network 108 as the digital content signal 112 and/or at the first parent client 106 as a digital content signal, shown in FIG. 1 as arrows 124. Hence the first child voucher 114' enables the first child client 116 to transfer or download the first digital content 122 to the first child client 116, view the first digital content 122 at the content provider 102, stream the first digital content 122 from the content provider 102 or from the first parent client 106, or any combination thereof.

Alternatively, only part of the first digital content is encrypted during streaming, e.g., the most important intra frames of a video sequence or amplification information of a musical piece. This way, the first digital content 122 may be streamed or played back from any source, i.e. the content provider 102 or the first parent client 106, at the first child client 116, while only streaming the encrypted pieces from the first parent client 106.

The second communication network 118 comprises a computer network, a wired or wireless telecommunication network, a power-line network, a television network, a proximity terrestrial network such as short range radio or Bluetooth, or any combination thereof.

For example, the an electronic newspaper subscription may include a proximity group voucher, i.e. a right of use voucher comprising one or more child vouchers, enabling sharing of digital content between a plurality of devices close to one another. The main subscriber (parent client) is responsible for sharing the child vouchers to the devices nearby e.g. within Bluetooth range or a wireless local area network (WLAN). After forwarding the child vouchers to the devices the main subscriber must authenticate the child vouchers using the proximity group voucher. While the child vouchers are valid the digital content may be accessed freely. Hence a newspaper or an e-book purchased by a first family member device is accessible by a second family device in the vicinity of the first family member device provided the second family device comprises a child voucher.

The term proximity should in this context be construed as a physical reality i.e. devices are physically close to one another or as a virtual reality i.e. the devices are virtually close to one another such as being established in a virtual reality arrangement. Also other measures of proximity such as those defined by a presence application, where people can define their desired relations digitally.

The streaming of digital content to a proximity group, i.e. a parent and one or more child clients, is particularly advantageous since a group voucher enables a plurality of clients to plug into a streaming server or a proxy of the streaming server to access the digital content. Short range multicast established by a multicast server is especially suitable for this purpose, since in this case all the clients (parent and children) are physically in the vicinity of the multicast server and therefore easily authenticated e.g. by the multicasting server acting as a content proxy for the content provider and as a voucher proxy for the owner of the rights of use voucher (parent). Hence, for example, a group of friends each having a client device may share a movie or a music video and watch it together on their own client devices.

When the first digital content 122 is protected by a digital rights management solution 126 in the system 100, the first digital content 122 may be forwarded to the first child client 116 directly as a file in a format prohibiting the first child client 116 to open the file without a valid first child voucher 114' restricted to a specific period and checked by the first parent client 106. Thus, since the first child voucher 114' is checked by the first parent client 106, the first parent client 106 does not necessarily need a continuous connection to the first communication network 108, which obviously provides a solution beneficiary to reducing communication costs.

Alternatively, the first digital content 122 is stored on memory 107 associated with the first parent client 106 and the first child client 116 streams the first digital content 122 from the first parent client 106 and utilises the first child voucher 114' for authenticating the streaming. Hence, for example, enabling sharing digitally protected music among friends.

In a further embodiment of the present invention the parent client 100 desires to share the first digital content 122 over the second communication network 118, e.g. a short range connection, randomly. The first parent client 106 has purchased a rights of use voucher comprising one or more child vouchers from the content provider 102 and offers the one or more child vouchers to one or more child clients 128 connected through connections 130 and 132 to the first and second communication network 108 and 118. Each of the one or more child clients 128 may utilise one of the provided child vouchers to stream the first digital content 122 purchased by the first parent client 106 directly from the content provider 102. Thus the first parent client 106 and the second communication network 118 is not unduly burdened by stream traffic. This particular embodiment of the present invention is advantageous as a micro radio station, for example, in buses, trains or other means of transportation, hotels, conference venues, airports etc.

As will be further described with reference to FIG. 2 the first right of use voucher 114 does not necessarily comprise a content key enabling the parent client 106 to access associated digital content 122 as a parent, but each of the first child voucher 114' may comprise a content key enabling the first child client 116 and/or the one or more child clients 128 to access the associated digital content 122. This is especially suitable in an implementation of a system where all the clients, also the parent client, act as child clients.

Alternatively, the first right of use voucher 114 comprises a content key enabling the parent client 106 to access associated digital content 122 provided by the content provider 102. In addition, the first parent client 106 may utilise a private encryption key for re-encrypting the digital content 122 so as to enable the first child client 116 and/or the one or more child clients 128 to decrypt the digital content 122 using a public encryption key.

FIG. 1, further shows second parent client 134 of the plurality of clients 104 connecting to the content provider 102 for accessing second piece of digital content 136. The content provider 102 forwards a second rights of use voucher 138 associated with the second piece of digital content 136 shown as the arrows 110, which second rights of use voucher 138 comprises one or more second child vouchers 138'. The one or more second child vouchers 138' is forwarded by the second parent client 134 to connecting one or more second child clients designated in entirety by reference numeral 140 through a third communication network 142 such as described with reference to the second communication network. This communication is shown as arrows 143.

It should be understood that the term first and second in this context is entirely used for differentiating between one or more parent clients, child clients and vouchers.

When the second parent client 134 distributes the one or more second child vouchers 138' that are verified against the second rights of use voucher 138, and the first parent client 106 distributes the one or more first child vouchers 114' that are verified against the first right of use voucher 114, then the verification sources (the first and second parent client 106 and 134) may be exchanged so that the first parent client 106 then comprises one or more second child vouchers 138' verifiable against the first rights of use 114 and the second parent client 134 then comprises the first child voucher 114' verifiable against the second rights of use 138. This provides a solution for more flexible use of digital content across a plurality of devices, while the use cannot be freely copied.

In the presently preferred embodiment of the system 100 the first and second parent clients 106 and 134 are mobile or fixed terminals or computers having computer or telecommunication network access points so as to communicate with the content provider 102, the child clients 116, 128 and 140 are mobile terminals or mobile terminal accessories such as MP3 players, smart headphones or video goggles; newspaper or book reading devices, and the second and third communication networks 118 and 142 are physical proximity networks.

The first parent client 106 further is capable of receiving a third right of use voucher 144 through a fourth communication network 146 through communication channels symbolized by arrows 148. The first parent client 106 forwards a child voucher 144' to the first child client 116 using the second communication network 118. The first child client 116 accesses a third digital content 150 from the content provider 102 by using the first communication network 108. The term "network" should in this context be construed as distributing information, and may comprise a physical carrier, such as a floppy disk, compact disc, digital versatile disk, memory card and stick or any other transportable memory media. For example, the first parent client 106 purchases music on a physical carrier (the fourth communication network 146). Along with the music comes child vouchers allowing child clients to listen to, for example, one song. The first parent client 106 sends a child voucher to one of his friends, having a child client i.e. the first child client 116, e.g. by using Bluetooth. In case, the first child client 116 wishes to listen to the song, when the first parent client 106 is not available, the first child client 116 accesses a web page hosted by the content provider 102 through the first communication network 108. The content provider 102 may in this case be a record company streaming the requested song to the first child client 116.

Figure 2:
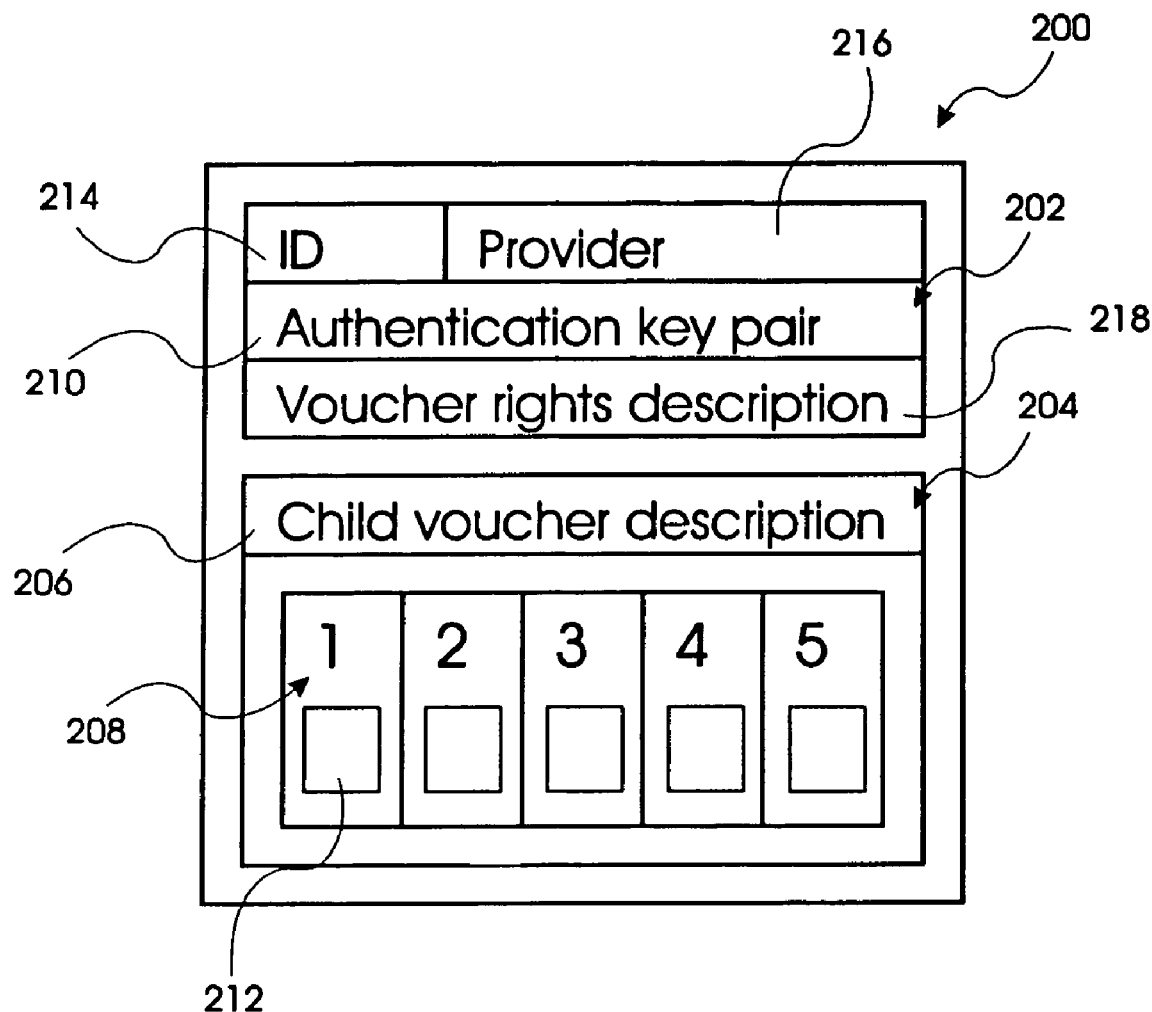
FIG. 2, shows a right of use voucher utilised in the system according to the first embodiment of the present invention.

FIG. 2, shows a right of use voucher designated in its entirety by reference numeral 200. The voucher 200 is a two part digital document having a parent part 202 and a child part 204. The child part 204 comprises a child voucher description 206 and one or more child vouchers 208. The parent part 202 comprises and authentication key pair 210 used for authenticating the one or more child vouchers 208. Each of the child vouchers 208 comprise a content key 212, which may be used for accessing digital content at a content provider provided the child voucher 208 is valid.

The parent part 202 further comprises a first identification element 214 for identifying the client associated with the rights of use voucher 200, a second identification element 216 for identifying the content provider associated with the rights of use voucher 200, and a voucher right description 218.

The content provider ties the rights of use voucher 200 to a specific parent client using the rights of use voucher 200 and said parent client ties each of the one or more child vouchers 208 to each of the child clients using the one or more child vouchers 208.

When a parent client purchases a right of use voucher 200 from a content provider, the content provider records the purchase and ties the parent client to the right of use voucher 200. The authentication key pair 210 and the content key 212 are encrypted by the content provider applying a public encryption key associated with and forwarded to the parent client. A private encryption key associated with the public key of the parent client is stored encrypted locally on memory associated with the parent client, only enabling the parent client to decrypt the authentication key pair 210 and the content key 212, when the parent client is operating in a protected mode.

The authentication key pair 210 comprises a public authentication key and a private authentication key. Since the parent client operates in a protected mode undesired revelation of the private encryption key has become very difficult. The private authentication key is used for signing the child vouchers 208, which signature further comprises the identification of the child client.

The right of use voucher 200 may comprise a plurality of child vouchers as shown in FIG. 2 or may in fact comprise the possibility of generating an unlimited number of child vouchers by using a voucher generator. The voucher generator comprises a secure application program provided by the content provider. The generation of child vouchers is recorded and reported back to the content provider e.g. as part of a normal authentication procedure.

Figure 3:
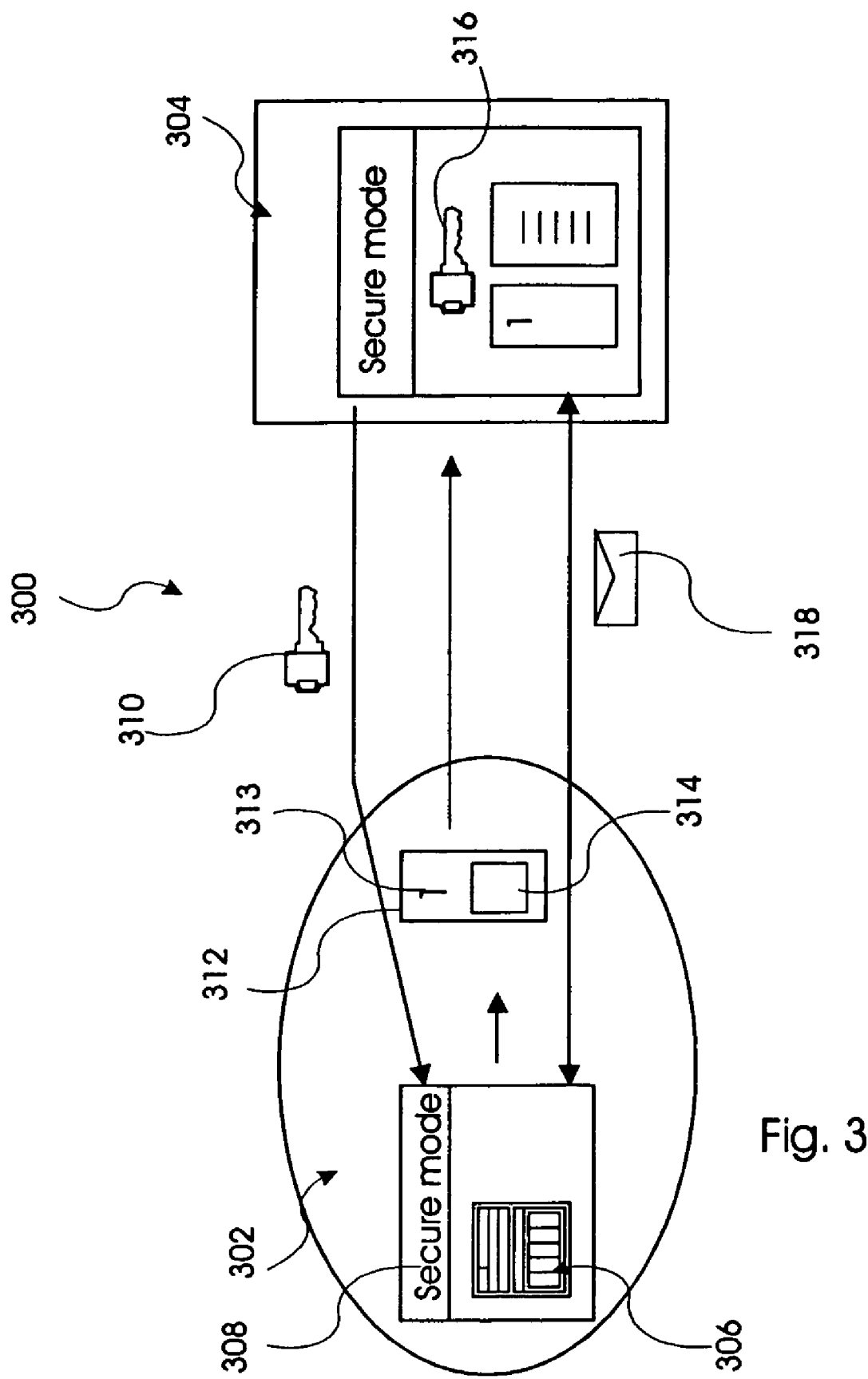
FIG. 3, shows an overall view of the communication performed in the system according to the first embodiment of the present invention.

FIG. 3, shows an overall view of the communication system designated in its entirety by reference numeral 300, which system 300 is established between a parent client 302 and an associated child client 304. The parent client 302 comprises a right of use voucher 306 (as described in FIG. 2 as reference numeral 200) in a secure mode 308. Before enabling the child client 304 to access digital content, the child client 304 forwards a public encryption key 310 associated with the child client 304 enabling the parent client 302 to encrypt a child voucher 312. The child client comprises, as described above with reference to FIG. 2, a content key 314.

The parent client 302 encrypts the child voucher 312 with the public encryption key 310 before communicating the child voucher 312 to the child client 304. The child client 304 decrypts the child voucher 312 using a private encryption key 316 associated only with the child client 304 and stored on memory associated with the child client 304. By decrypting the child voucher 312 the content key 314 is revealed and the child client 304 may access the digital content either directly at the content provider or at the parent client 302.

During the entire process of accessing digital content the parent client 302 regularly authenticates the child client 304 by communicating a signed child voucher refresher 318 comprising at least a new validity period of the child voucher 314 and an identification tag 313 of the child voucher 312. Prior to communicating the signed child voucher refresher 318 the parent client 302 encrypts the signed child voucher refresher 318 using the public encryption key 310.

When child vouchers, such as for example the child voucher 312, are exchanged between child clients associated to one or more parent clients a protocol is required so as to avoid unauthorised copying or accessing of the digital content. The protocol comprises encryption of the child vouchers to be exchanged between child clients. For example if a first and second child client wishes to exchange a first and second child voucher, respectively, the first child client utilises a public encryption key of the second child client for encrypting the first child voucher to be communicated to the second child client and the second client utilises a public encryption key of the first child client for encrypting the second child voucher to be communicated to the first child client. Thus, the coding of both child vouchers are changed in associated child client so that the child voucher are encrypted in accordance with the receiving child client's public encryption key.

The protocol further comprises establishing a child voucher dependency on the parent vouchers i.e. in the original parent client and in the receiving parent client. That is, the first child voucher requires preliminary authentication from the first child client's parent and the second child client's parent in order to utilise the second child voucher, and the second child client, similarly, requires preliminary an authentication from the first child client's parent and the second child client's parent in order to utilise the first child voucher. Following the authentication of the first and second child vouchers the requirement for the originating parent clients to authenticate transferred child vouchers is removed.

The protocol further comprises verification of compatibility between the child vouchers, setting of stale flags for the to-be-exchanged child vouchers in the right of use voucher in the parent client, and deactivating the child vouchers. That is, the first child client's access to the digital content associated with the first child voucher is disabled for the first child client and, similarly, the second child client's access to the digital content associated with the second child voucher is disabled for the second child client. The associated parent clients are notified and a flag for the child clients is set in the right of use voucher.

The protocol further comprises deleting of the child vouchers from the initial child clients. That is, the first child client having a local memory deletes from the memory the first child voucher and the second child client having a local memory deletes from the memory the second child voucher.

The protocol further comprises receiving and decrypting of the child vouchers utilising associated private encryption keys of the receiving child clients followed by confirmation of successful exchange. The confirmation may comprise forwarding a non-essential part of the child voucher to the sending child client e.g. a part of the child voucher description (reference numeral 204 in FIG. 2) or an identification tag (reference numeral in FIG. 3), which is signed with the confirming child client's private encryption key. In addition, upon receiving and verification of the signed non-essential part of the child voucher, the parent clients authenticate the child vouchers thereby activating the child vouchers. That is, the first child client receives and decrypts the second child voucher and confirms the receipt by utilising the first child client private encryption key to sign a non essential part of the second child voucher and forwards this information to the second child client. Following the reception and verification of information and signature the first parent client authenticates the first child client's second child voucher.

In addition, the protocol further comprises enabling chained exchange of child vouchers, while prohibiting copying, by introducing a chain of first identification elements of the parent clients (such as the first identification element 214 shown in FIG. 2) into child voucher thereby enabling the content provider or the parent client to track the child voucher.

Figure 4:
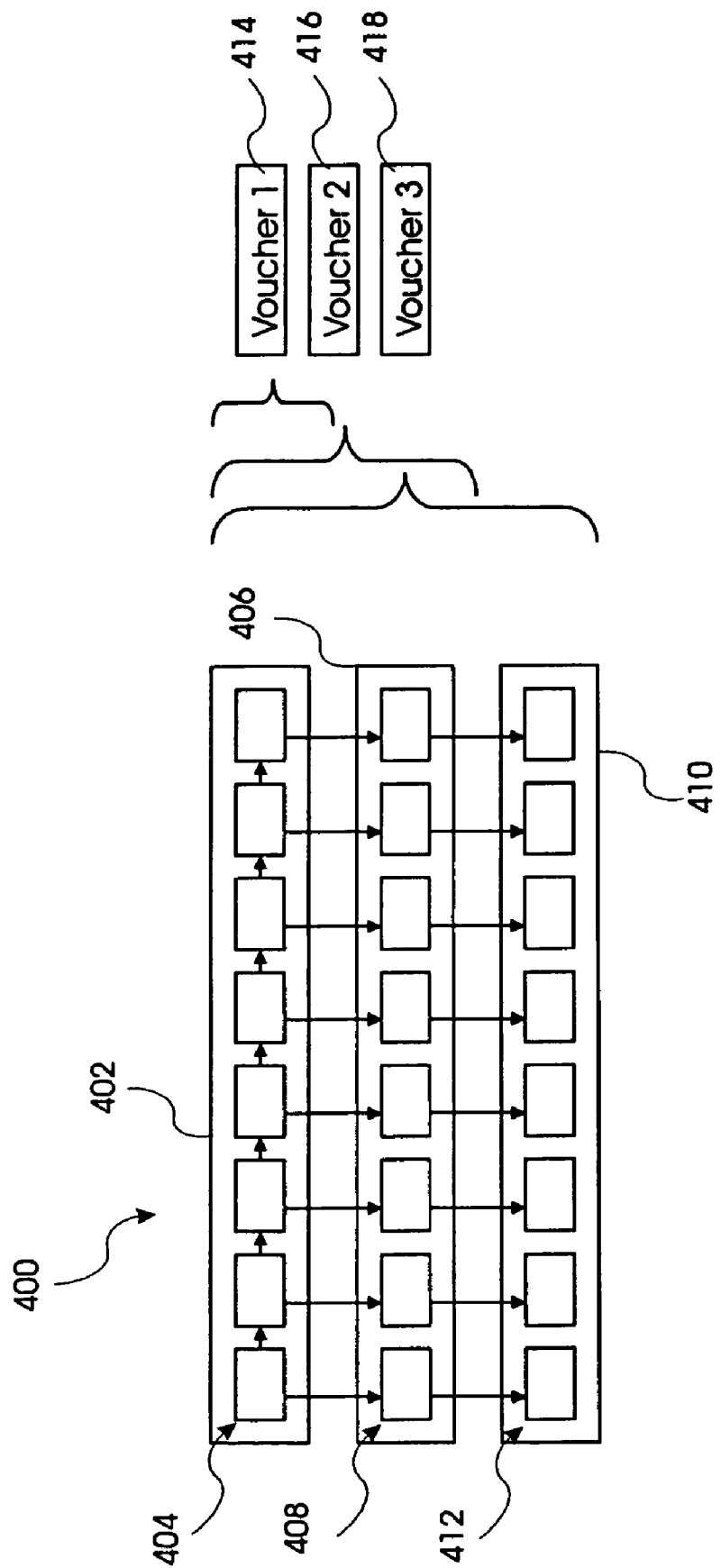
FIG. 4, shows a system according to a further embodiment of the present invention.

FIG. 4, shows a further embodiment of the present invention in which a system designated in entirety by reference numeral 400. The system 400 enables encryption of digital content in a multi-resolution manner, wherein a plurality of decryption keys enable the use of different levels of the digital content.

The system 400 comprises a low resolution stream 402 comprising one or more basic data sets 404 to be streamed, a first enhancement stream 406 comprising one or more first data sets 408, which are based on the one or more basic data sets 404, and a second enhancement stream 410 comprising one or more second data sets 412, which are based on the one or more first data sets 408.

The client may access the one of the streams 402, 406 and/or 410 in accordance with the client's voucher. A basic voucher 414 enables the client to access the low resolution stream 402, a first enhanced voucher 416 enables the client to access the first enhanced stream 406, and the second enhanced voucher 418 enables the client to access the second enhance stream 410.

The system 400 thus enables an owner of a right of use voucher to allow full use of the digital content associated with the right of use voucher to some child clients while allowing reduced use of the digital content to other child clients. The reduced use may result in a reduced resolution or quality of the digital content being accessed.

Figure 5:
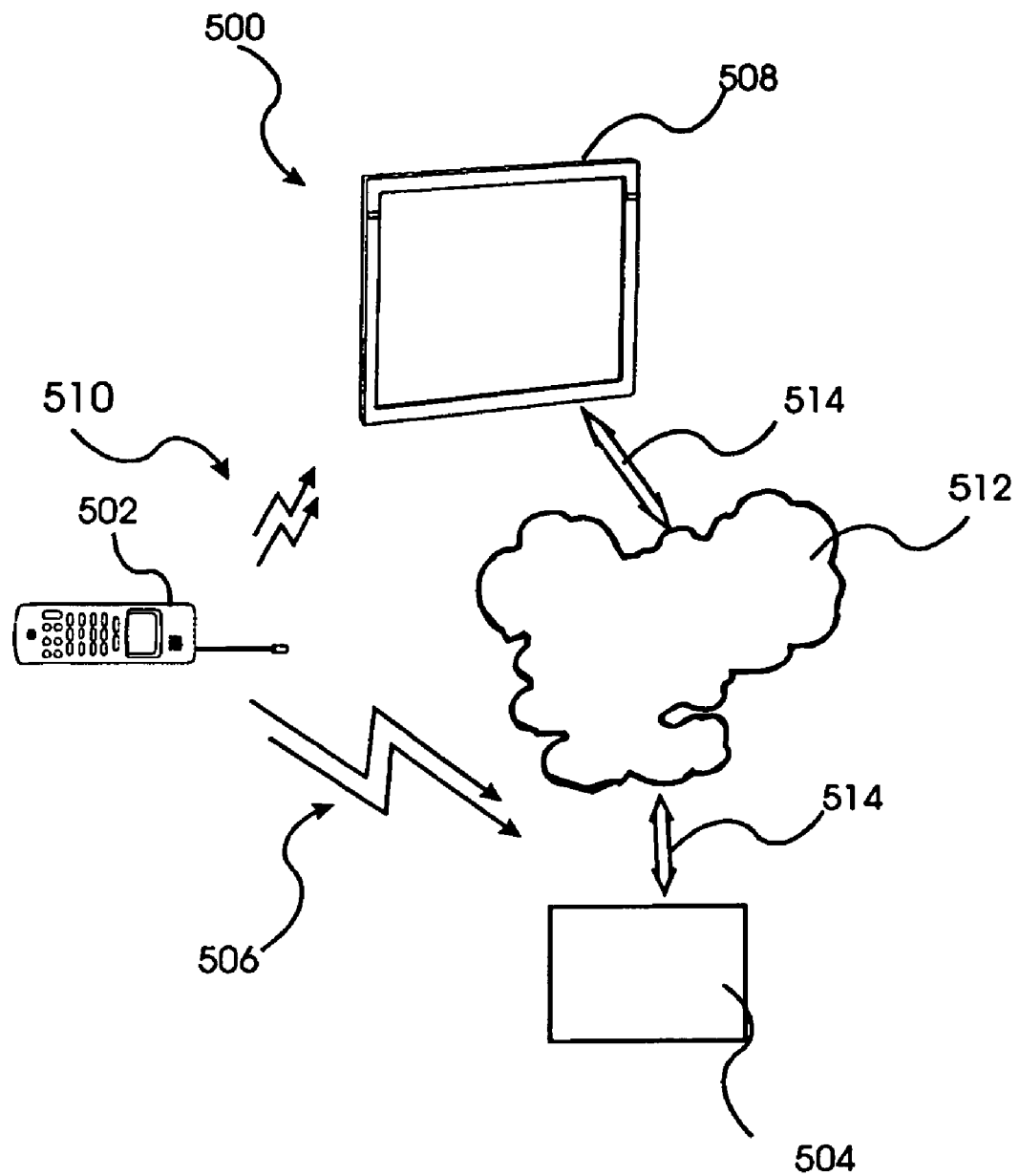
FIG. 5, shows an example of utilisation of the first embodiment of the present invention.

FIG. 5 shows a system designated in its entirety by reference numeral 500, which system comprises a communication terminal 502, such as a cellular phone, communicating with a content provider server 504 through a wireless communication system. The communication terminal 502 purchases a right of use voucher from the content provider server 504 and forwards a child voucher contained in the right of use voucher to a display 508, such as a TV set, through a Bluetooth link 510. The display 508 may now access digital content associated with the right of use voucher from the communication terminal 502 or from the content provider server 504 through a communication network 512 such as the Internet. The communication between the display 508 and the content provider server is illustrated in FIG. 5 as arrows 514.

The invention claimed is:

1. A system for providing access to digital content comprising:
   a first client family comprising a first parent client and one or more first child clients connected in a second communication network, the system providing the first client family access to a first digital content;
   a right of use voucher associated with said first digital content comprising a first content key and one or more first child vouchers; and
   a content provider programmed to connect to said first parent client through a first communication network and programmed to communicate said right of use voucher to said first parent client; wherein
      said first parent client is programmed to communicate said one or more first child vouchers to said one or more first child clients through said second communication network, and said one or more first child clients are programmed to access said first digital content associated with said right of use voucher; and
      wherein said content provider is programmed to provide access to said first digital content to said one or more first child clients having a child voucher access, through said first communication network;
   a second parent client is programmed to connect to said content provider utilizing said communication network;
   a second right of use voucher including one or more second child vouchers that are communicated by the content provider to said second parent client, the second right of use voucher being used to access a second digital content provided by said content provider;
   a third communication network programmed to forward said one or more second child vouchers to one or more second child clients, wherein said one or more second child vouchers are programmed to access said second digital content when the validity of said one or more second child vouchers is authenticated by said second parent client; and
   wherein said first child clients and said one or more second child clients are programmed to exchange said one or more first child vouchers and said one or more second child vouchers by:
      verifying compatibility between one or more first and second child vouchers;
      deactivating to-be-exchanged child vouchers by setting state flags in associated right of use vouchers in said first and second parent client; and
      a first child client of said one or more first child clients having a second child voucher of said one or more second child vouchers is programmed to access said second digital content with said second child voucher provided that said first parent client and said second parent client are able to authenticate the validity of said second child voucher; and
      a second child client of said one or more second child clients having a first child voucher of said one or more first child vouchers is programmed to access said first digital content with said first child voucher provided that said first parent client and said second parent client are able to authenticate the validity of said first child voucher.

2. System according to claim 1, wherein said first parent client is programmed to access said first digital content from said content provider through said first communication network by applying said first content key.

3. System according to claim 1, wherein said first parent client comprises an encryption key programmed to encrypt said first digital content for said one or more first child clients comprising a decryption key associated with said encryption key.

4. System according to claim 1, wherein said first client family comprises a laptop or desktop computer, a personal digital assistant, a mobile or cellular phone, a set-top box, television set, a videophone, or any combination thereof.

5. System according to claim 1, wherein said second communication network comprises a computer network, a wired or wireless telecommunication network, a power-line network, a television network, a proximity terrestrial network such as short range radio or Bluetooth, or any combination thereof.

6. System according to claim 1, wherein said first communication network comprises a wired or wireless telecommunication network, a terrestrial, satellite, or cable television network, a power-line network, a computer network, or any combination thereof.

7. System according to claim 1, wherein said first communication network comprises a physical, tangible carrier comprising a floppy disk, a compact disc, a digital versatile disc, a memory card, a memory stick, or any combination thereof.

8. System according to claim 5, wherein said computer network comprises a wired or wireless local area network, metropolitan area network, wide area network, inter-network, or any combination thereof.

9. System according to claim 1, wherein said one or more first child clients are programmed to access digital content from said first parent client through said second communication network.

10. System according to claim 1, wherein said first digital content comprises graphics, series of graphics, text, series of texts, picture, series of pictures, video, sequences of videos, audio track or series of audio tracks or any combination thereof.

11. System according to claim 1, wherein said right of use voucher further comprises:
   a first identification tag for identifying a specific first parent client of said first client family owning said right of use voucher;
   a second identification tag for identifying a content provider programmed to provide access for said specific first parent client and one or more first child clients to said first digital content;
   an authentication key pair programmed to authenticate said one or more first child vouchers, and the authentication key pair comprising a public authentication key and a private authentication key.

12. System according to claim 1, wherein each of said one or more first child vouchers comprises a copy of said first content key that is programmed to allow each of said one or more first child clients to access said first digital content.

13. System according to claim 1, wherein said content provider is programmed to encrypt said right of use voucher by applying a public encryption key of said first parent client.

14. System according to claim 1, wherein said first parent client is programmed to authenticate said one or more first child clients having said one or more first child vouchers by communicating a signed child voucher refresher comprising a validity period of associated first child voucher and an identification tag of said associated first child voucher.

15. System according to claim 1, wherein said first parent client is programmed to transfer said first digital content to reside in a local memory, view said first digital content at said content provider, receive a stream of said first digital content from said content provider, or any combination thereof.

16. System according to claim 1, wherein said one or more first child clients are programmed to view said first digital content at said content provider or said first parent client, receive a stream of said first digital content from said content provider or said first parent client, or any combination thereof.

17. System according to claim 1, wherein said content provider is programmed to connect to a second client family comprising a second parent client and one or more second child clients connected through a third communication network and wherein said programmed one or more second child clients are programmed to access a second digital content on the basis of one or more second child vouchers associated with said second digital content and with each of said one or more second child clients.

18. System according to claim 17, wherein a first child client of said first client family and a second child client of said second client family are programmed to exchange a first child voucher associated with said first digital content and with said first child client and a second child voucher associated with said second digital content and with said second child client.

19. A method for providing access to digital content comprising:
connecting to a first parent client by means of a content provider utilizing a first communication network;
communicating a first right of use voucher comprising one or more first child vouchers by means of said content provider to said first parent client;
forwarding said one or more first child vouchers to one or more first child clients from said first parent client through a second communication network;
accessing a first digital content by means of said one or more first child vouchers provided that the validity of said one or more first child vouchers is authenticated;
wherein said one or more first child clients comprise a connection to said first communication network and wherein said one or more first child clients having a child voucher is programmed to access, through said first communication network, said first digital content from said content provider;
connecting to a second parent client by means of said content provider utilizing said communication network;
communicating a second right of use voucher including one or more second child vouchers by means of said content provider to said second parent client;
accessing a second digital content provided by said content provider by means of said second right of use voucher;
forwarding said one or more second child vouchers to one or more second child clients through a third communication network; and
accessing said second digital content by means of said one or more second child vouchers provided that the validity of said one or more second child vouchers is authenticated by said second parent client; and
exchanging said one or more first child vouchers and said one or more second child vouchers between the first child clients and said one or more second child clients by:
verifying compatibility between one or more first and second child vouchers;
deactivating to-be-exchanged child vouchers by setting state flags in associated right of use vouchers in said first and second parent client;
accessing, by a first child client of said one or more first child clients having a second child voucher of said one or more second child vouchers, said second digital content by means of said second child voucher provided that said first parent client and said second parent client are able to authenticate the validity of said second child voucher; and
accessing, by a second child client of said one or more second child clients having a first child voucher of said one or more first child vouchers, said first digital content by means of said first child voucher provided that said first parent client and said second parent client are able to authenticate the validity of said first child voucher.

20. Method according to claim 19 further comprising accessing, by said first parent client, a first digital content provided by said content provider by means of said first right of use voucher.

21. Method according to claim 19 further comprising encrypting said first digital content in accordance with an encryption key by means of said first parent client for said one or more first child clients comprising a decryption key associated with said encryption key.

22. Method according to claim 19 further comprising receiving by means of said content provider a report from said first parent client, which report comprises information on number child vouchers generated by means of a child voucher generating means associated with said right of use voucher.

23. Method according to claim 19 further comprising:
encrypting, by said first parent clients, said one or more first child vouchers with a public encryption key associated with said one or more first child clients before communicating said one or more first child vouchers to said one or more first child clients;
decrypting, by said one or more first child clients preferably in a secure mode, said one or more first child vouchers with a private encryption key associated with said one or more first child clients to reveal a content key to access said first digital content.

24. Method according to claim 23, wherein said first parent clients encrypt said one or more first child vouchers with a public encryption key associated with said one or more first child clients before communicating said one or more first child vouchers to said one or more first child clients and said one or more first child clients decrypt, preferably in a secure mode, said one or more first child vouchers with a private encryption key associated with said one or more first child clients to reveal a content key to access said first digital content, all in a secure mode.

25. Method according to claim 19, further comprising said first parent client authenticating said one or more first child clients by communicating a signed child voucher refresher including a new validity period for said one or more first child vouchers and an identification tag of said one or more first child vouchers.

26. Method according to claim 19, further comprising:
accessing, by a basic voucher, a low-resolution stream comprising one or more basic data sets;
accessing, by a first enhanced voucher, a first enhancement stream comprising one or more first data sets, which first data sets are based on said basic data sets.

27. Method according to claim 26, further comprising accessing, by a second enhanced voucher, a second enhancement stream comprising one or more second data sets, which second data sets are based on said first data sets.

28. A computer program stored in a computer readable storage medium comprising code programmed to perform the following steps when said program is run on a processor:
connecting to a first parent client by means of a content provider utilizing a communication network;

communicating a first right of use voucher comprising one or more first child vouchers by means of said content provider to said first parent client;

said first parent client forwarding said one or more first child vouchers to one or more first child clients through a second communication network;

said one or more first child clients accessing said first digital content by means of said one or more first child vouchers provided that the validity of said one or more first child vouchers is authenticated;

wherein said one or more first child clients comprise a connection to said first communication network and wherein said one or more first child clients having a child voucher through said first communication network accessing said first digital content from said content provider;

connecting to a second parent client by means of said content provider utilizing said communication network;

communicating a second right of use voucher including one or more second child vouchers by means of said content provider to said second parent client;

accessing a second digital content provided by said content provider by means of said second right of use voucher;

forwarding said one or more second child vouchers to one or more second child clients through a third communication network; and accessing said second digital content by means of said one or more second child vouchers provided that the validity of said one or more second child vouchers is authenticated by said second parent client; and exchanging said one or more first child vouchers and said one or more second child vouchers between the first child clients and said one or more second child clients by:

verifying compatibility between one or more first and second child vouchers;

deactivating to-be-exchanged child vouchers by setting state flags in associated right of use vouchers in said first and second parent client;

accessing, by a first child client of said one or more first child clients having a second child voucher of said one or more second child vouchers, said second digital content by means of said second child voucher provided that said first parent client and said second parent client are able to authenticate the validity of said second child voucher; and accessing, by a second child client of said one or more second child clients having a first child voucher of said one or more first child vouchers, said first digital content by means of said first child voucher provided that said first parent client and said second parent client are able to authenticate the validity of said first child voucher.

29. A computer program according to claim 28, wherein said processor comprises a content provider, a parent client, a child client, or any combination thereof.

* * * * *